Figure 1:
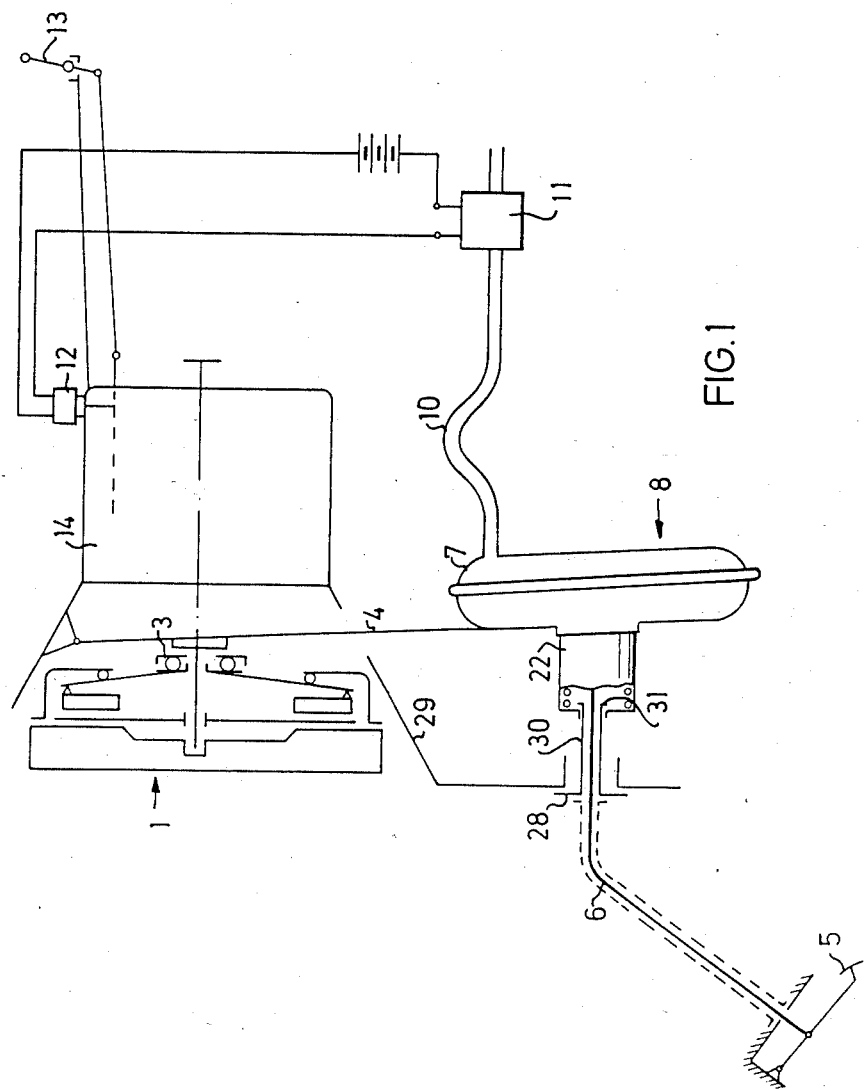

United States Patent [19]

Radbo et al.

[11] Patent Number: 4,567,970
[45] Date of Patent: Feb. 4, 1986

[54] DEVICE FOR ELIMINATING IDLING RATTLE IN A VEHICLE GEARBOX

[75] Inventors: Berndt E. Rådbo, Västra Frölunda; Grzegorz K. Janiszewski, Angered, both of Sweden

[73] Assignee: AB Volvo, Gothenburg, Sweden

[21] Appl. No.: 592,452

[22] Filed: Mar. 20, 1984

[30] Foreign Application Priority Data

Mar. 30, 1983 [SE] Sweden ............................ 8301787

[51] Int. Cl.$^4$ ............................................ B60K 41/22
[52] U.S. Cl. ..................................... 192/3.59; 192/101
[58] Field of Search ................ 192/3.59, 3.57, 3.58, 192/0.08, 92, 101, 104 R, 106 R, 30 V

[56] References Cited

U.S. PATENT DOCUMENTS

| | | | |
|---|---|---|---|
| 3,327,817 | 6/1967 | Ivanchich | 192/0.08 |
| 3,709,340 | 1/1973 | Murakami et al. | 192/3.58 |
| 4,281,751 | 8/1981 | Suga et al. | 192/3.59 |

FOREIGN PATENT DOCUMENTS

| | | | |
|---|---|---|---|
| 19232 | 9/1980 | Japan | 192/3.58 |
| 18819 | 1/1982 | Japan | 192/3.58 |

*Primary Examiner*—Magdalen Y. C. Moy
*Attorney, Agent, or Firm*—Young & Thompson

[57] ABSTRACT

Vacuum-regulated system for automatic disengagement of a manual clutch in a vehicle for eliminating mechanical rattle from the vehicle gearbox during idling. A servo unit in the system is joined to the clutch releasing arm and is controlled by the gearbox shift lever for moving the release arm to disengaged position when the lever is in neutral position. The control cable of the clutch pedal is connected to the servo unit via springs, against the force of which the pedal can move in the disengaging direction when the servo unit is holding the clutch in disengaged position.

5 Claims, 2 Drawing Figures

DEVICE FOR ELIMINATING IDLING RATTLE IN A VEHICLE GEARBOX

The present invention relates to a device for eliminating mechanical rattling when idling, in a manual-shift gearbox connected to a manual disengaging clutch.

In most cars with manual transmissions, there is mechanical rattling when idling. The noise arises when the teeth of the gears strike against each other at a certain frequency, when the gears in the gearbox are forced to accelerate due to non-uniform running of the engine at low rpm. The engine flywheel has a greater angular acceleration and oscillation amplitude at low rpm, so the idling rattle increases in most cases with decreasing idling rpm. On the other hand, the engine has better fuel economy at a low idle rpm, and therefore one tries to achieve an idle speed which is as low as possible.

A number of different attempts have been made to reduce or completely eliminate idling rattle. It is possible to use, for example, clutches of particular rigidity and muffling effect, increasing the moment of inertia of the flywheel or reducing gear backlash. It is also possible to use a friction brake in the gearbox or preload the gears or change their moments of inertia. In most cases, these steps are not sufficient to completely eliminate idling rattle. In addition, most of them are relatively costly, since they require dismantling of existing clutches and gearboxes and modification of the components therein.

The purpose of the present invention is to achieve a device of the type described by way of introduction, which guarantees a onehundred percent reduction of idling rattle from the gearbox without having to do anything to the clutch or gearbox.

This is achieved according to the invention by means of a device which comprises a servo unit coupled between the manual clutch operating means and its disengaging mechanism, said unit being controlled by the gearbox gear lever to provide, when the lever is in its neutral position, automatic disengagement of the clutch, and being joined to the manual operating means and the disengaging mechanism, so that the servo unit, when non-actuated, forms a movement-transmitting element between the operating means and the disengaging mechanism, spring means being provided, against the force of which the manual operating means are movable in the direction of disengagement, when the servo unit is holding the clutch in the disengaged position.

The invention attacks the problem of eliminating idling rattle in the gearbox from an entirely new angle. Instead of making various design changes, as has been done previously, in order to muffle directly the rattling from rotating components in the gearbox, according to the invention, the clutch is automatically disengaged without the driver ever being aware of it. When the torque transmission between the clutch and the gearbox has been broken, there will be no rotational movement in the gearbox and, consequently, there can be no gearbox rattling arising from gear rotation. An essential feature of the device according to the invention is that the vehicle must be able to be operated manually as usual without the driver noticing that the automatics have "taken over". This is so as to avoid creating any feeling of uncertainty. When the automatic mechanism is keeping the clutch disengaged, said spring means present a resistance to pedal movement which is taken to be the resistance which the clutch springs pressing against the pressure plate present against pedal movement during manual disengagement. The driver can thus not feel through the pedal whether or not the clutch has been automatically disengaged.

Figure 2:
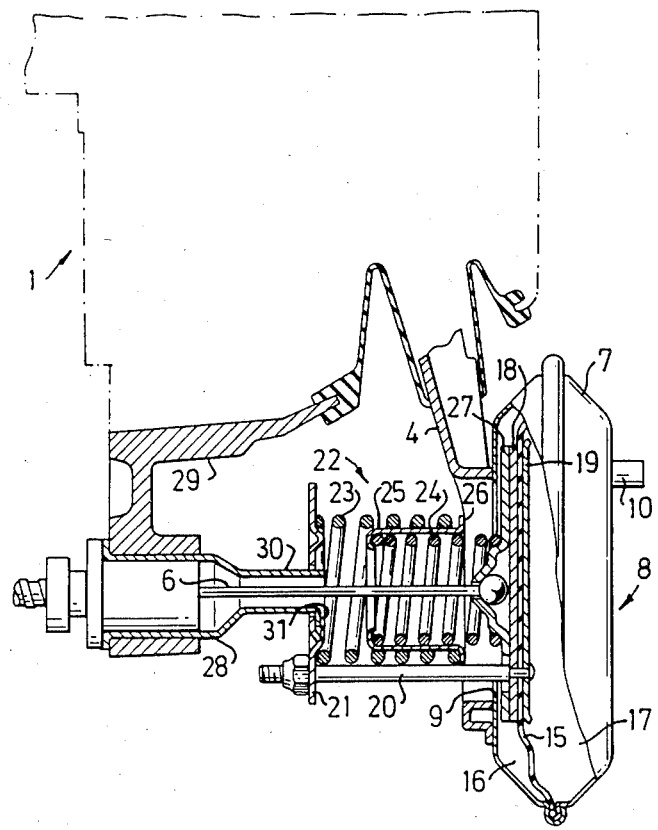

The invention will be described in more detail with reference to an example shown in the accompanying drawings, of which FIG. 1 shows schematically a clutch and a gearbox with a servo unit for automatic disengagement, and FIG. 2 shows a longitudinal section through the servo unit in FIG. 1.

In FIG. 1, 1 designates a common single disc clutch which can be disengaged in a conventional manner by means of a pivoted releasing arm 4 acting on a releasing bearing 3 and which can be actuated by the clutch pedal 5 via a cable 6.

According to the invention, the releasing arm 4 is fixed to the housing 7 of a vacuum servo unit (generally designated 8), which is connected via a hose 10 with a magnetic valve 11 to the engine intake manifold (not shown). The magnetic valve 11 is controlled by a switch 12, the setting of which is determined by the position of the shift lever 13 of the gearbox 14 connected to the clutch, so that the magnetic valve 11 is held open when the shift lever is in the neutral position, but which is closed in all other shift positions. Thus, in the neutral position, the servo unit 8 is subjected to a negative pressure, so that the clutch is automatically disengaged in the manner described below with particular reference to FIG. 2.

The servo unit housing 7 contains a membrane 15, which divides the interior of the housing into two chambers 16, 17, of which chamber 16 is always in communication with the atmosphere via an opening 9 in the housing, and chamber 17 can be put in communication with the source of low pressure (the manifold) via the hose 10. The membrane 15 is fixed between two plates 18,19, which together with pin bolts 20 and a bottom plate 21 form a spring holder 22 for two concentric helical springs 23,24. The inner spring 24 projects out through the outer spring 23 and rests against the bottom of a cup 25 which has a flange 26 resting against the end of the spring 23. The spring package thus formed is tensioned between the bottom plate 21 and, via a loose plate 27, the membrane 15. The cable 6 to the clutch pedal 5 is fastened to the loose plate 27. The cable jacket is anchored 28 in the clutch casing 29. A cylindrical portion 30 of the anchoring means 28 projects through a hole in the bottom 21 of the spring holder and is made with a shoulder 31 which forms a movement-limiting abutment.

FIG. 2 shows the relative positions of the various components when the clutch is engaged for normal driving. During manual disengagement, there is no change of the relative position shown of the components in the servo unit 8 itself; rather, the entire unit moves to the left—as seen in FIG. 2—and the bottom 21 of the spring holder slides along the cylindrical portion 30 of the anchoring means 28. Thus, for manual operation via the clutch pedal, the servo unit only forms a passive connection between the cable 6 and the release arm 4.

When the shift lever 13 is moved to the neutral position, the magnetic valve 11 opens, and the chamber 17 is evacuated. This would normally result in a displacement of the membrane 15 to the right as seen in FIG. 2, but since the bottom plate 21 abuts against the abutment 31, the membrane and the parts joined thereto are fixed against movement in this direction, which results instead in the servo unit housing 7 moving to the left, whereby the release arm 4 is moved and disengages the clutch. If the driver in this position depresses the clutch pedal 5, the springs 23,24 are compressed by the cable 6 pulling the plate 27 to the left. This has no effect on the clutch, since it has already been disengaged automatically, but the spring resistance "deceives" the driver into believing that he is releasing the clutch in the ordinary manner. The springs 23,24 are arranged in the manner shown and described to provide progressive resistance which resembles the resistance provided by the clutch springs acting on the pressure plate during normal manual disengagement.

What we claim is:

1. Device for eliminating mechanical rattling when idling in a manual-shift gearbox connected to a manual disengaging clutch having manual clutch operating means comprising a gearbox gear lever that controls a clutch disengaging mechanism, characterized by a servo unit coupled between the manual clutch operating means and the disengaging mechanism, said unit being controlled by the gearbox gear lever to provide, when the lever is in its neutral position, automatic disengagement of the clutch, and being joined to the manual operating means and the disengaging mechanism, so that the servo unit, when non-actuated, forms a movement-transmitting element between the operating means and the disengaging mechanism, spring means being provided, against the force of which the manual operating means are movable in the direction of disengagement, when the servo unit is holding the clutch in the disengaged position.

2. Device according to claim 1, characterized in that the servo unit has a first limitedly displaceable member, which is operatively connected via spring means to the manual operating means, and a second member which is movable relative to the first member upon actuation of the servo unit and is operatively connected to the disengaging mechanism, said two members, when the servo unit is not actuated, being movable together when the manual operating means are displaced towards the disengaged position, a reactive element, upon actuation of the servo unit, preventing movement of said first member so that disengagement is effected by movement of the second member relative to the first member while the operating means remain in the position for engagement.

3. Device according to claim 1, characterized in that said spring means exert a resistance against the manual disengagement movement when there is automatic disengagement, which resistance is approximately equal to the resistance exerted on the manual operating means when there is manual disengagement by the clutch spring means acting in the direction of engagement on a pressure plate of the clutch 4. Device according to claim 1, characterized in that the servo unit is a vaccum unit, which comprises a housing which is rigidly joined to a disengaging fork of the clutch and which contains a membrane dividing the housing into two chambers, one of which is in communication with the atmosphere and the other being in communication via a conduit with a source of low pressure, said membrane, on its side facing the chamber at atmospheric pressure, being joined to a spring holder which holds said spring means and cooperates with reaction means to prevent, upon establishment of low pressure in said chamber, the spring holder and the membrane joined thereto from moving towards the low pressure chamber, whereby the housing and the fork move in the opposite direction instead.

5. Device according to claim 4, characterized in that the spring means consist of a pair of concentric helical springs, of which the inner spring projects out through the outer spring and has one end resting against the bottom of a cup which is inserted into the outer spring and is supported against one end thereof, the spring package thus formed being tensioned between a bottom of the holder and, via an intermediate loose plate, a plate joined to the membrane, said loose plate being joined to a pull means which extends through the spring package and an opening in the bottom of the holder and is joined to a clutch pedal.

* * * * *